(12) United States Patent
Nishitani (10) Patent No.: US 6,757,818 B1
(45) Date of Patent: *Jun. 29, 2004

(54) PROGRAMMABLE MICROCONTROLLER FOR CONTROLLING MULTICHANNEL SEQUENCES OF STATES TO BE PROCESSED IN EACH PROCESSING PERIOD

(75) Inventor: Shuji Nishitani, Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,550

(22) Filed: Feb. 2, 2000

(30) Foreign Application Priority Data

Feb. 2, 1999 (JP) .............................................. 11-24580

(51) Int. Cl.[7] .............................................. G06F 15/00
(52) U.S. Cl. ....................... 712/245; 712/228; 712/232; 712/246
(58) Field of Search ................................ 712/245, 246, 712/232, 228

(56) References Cited

U.S. PATENT DOCUMENTS

| 4,197,579 A | * | 4/1980 | Otis et al. .................... 709/107 |
| 5,023,484 A | * | 6/1991 | Pathak et al. .................. 326/40 |
| 5,426,744 A | * | 6/1995 | Sawase et al. .............. 712/228 |
| 6,327,508 B1 | * | 12/2001 | Mergard ........................ 700/1 |

* cited by examiner

Primary Examiner—Jeffrey Gaffin
Assistant Examiner—Justin Knapp
(74) Attorney, Agent, or Firm—Hogan & Hartson LLP (57) ABSTRACT

A programmable controller for controlling a multi-channel sequential processing of states based on a prescribed state transitions. The microcontroller has a state register for each of the channels for holding the state data to be processed in the channel in the next processing period, and upon receipt of a sampling clock and a channel processing request, executes a program to process the states in each of the channels based on the states data held in the associated state register. The microcontroller may execute a program having a complex sequence in a reduced number of steps.

4 Claims, 7 Drawing Sheets

PROGRAMMABLE MICROCONTROLLER FOR CONTROLLING MULTICHANNEL SEQUENCES OF STATES TO BE PROCESSED IN EACH PROCESSING PERIOD

FIELD OF THE INVENTION

The invention relates to a microcontroller for controlling various types of sequences.

BACKGROUND OF THE INVENTION

Microprocessors have been widely used in controlling various types of sequences in a digital servo system in optical disc system for example. A well known tool to represent such sequence is a timing chart, which is not very comprehensive, however, particularly when the sequence involves many objects to process. An intuitive yet more comprehensive tool is a state transition diagram which allows one to directly grasp the relationships among the objects. Indeed, a sequence is often controlled by a microprocessor based on a programmed state transitions appearing in the diagram.

Such sequence is normally processed at a regular time interval called sampling period or processing period. To do this, a timer or software is needed to make interruptions based on the calculation of the period.

Figure 1:
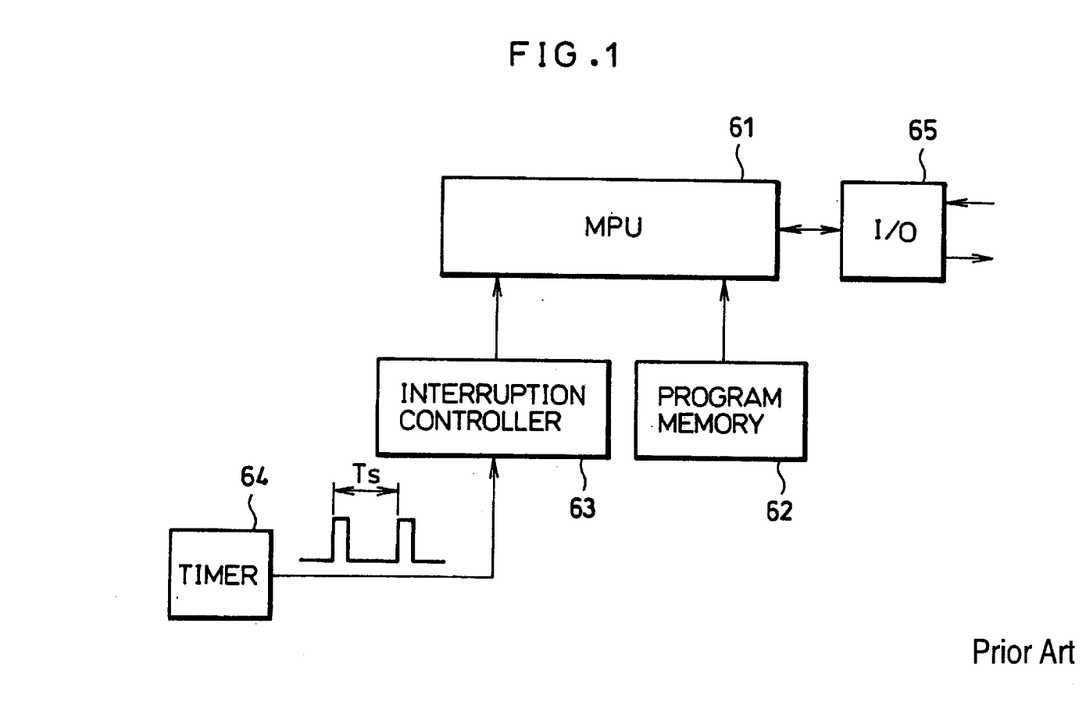
FIG. 1 is a block diagram of a sequence control system using a conventional microprocessor.
Figure 2:
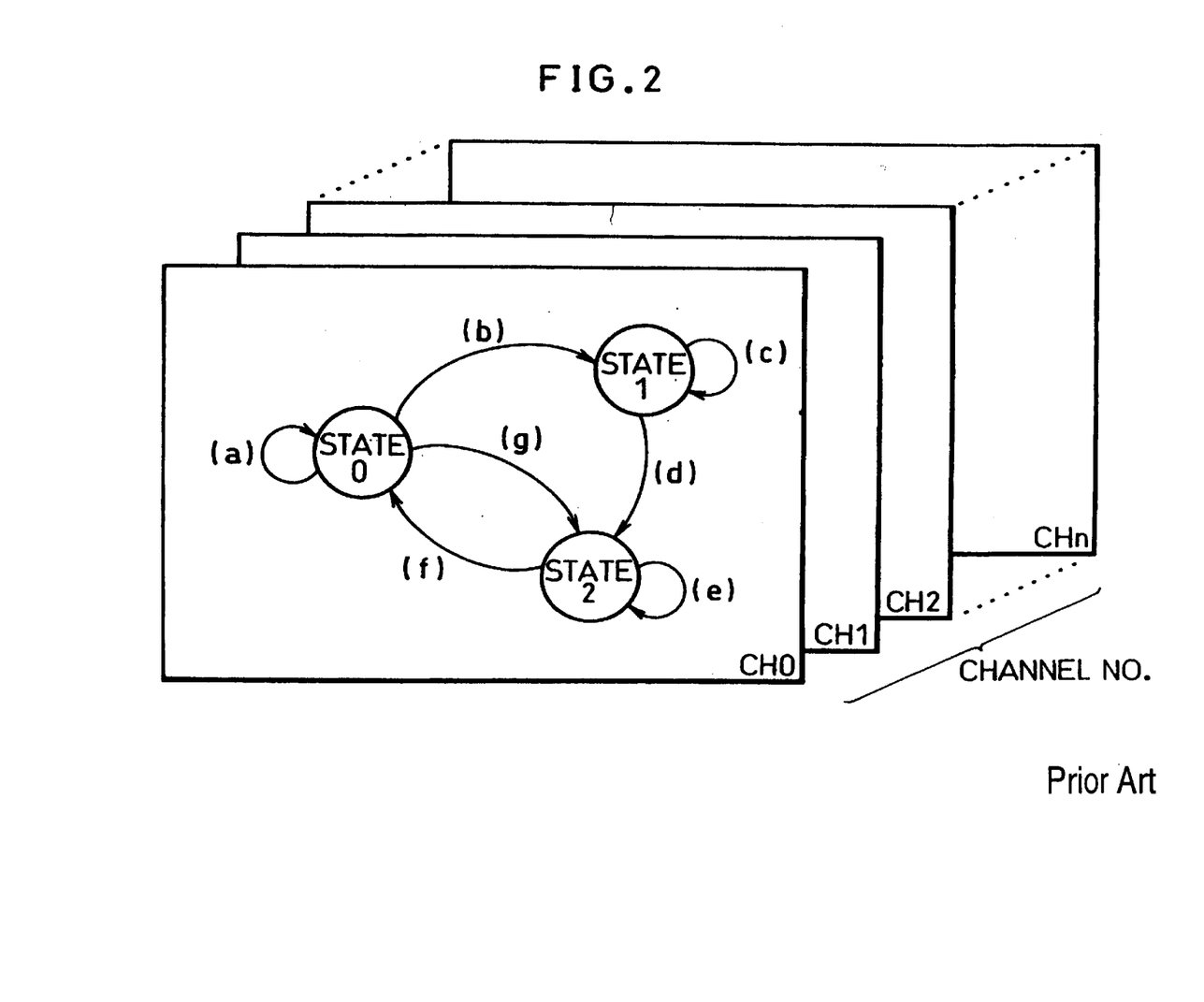
FIG. 2 is a schematic diagram of a multiplicity of channels each having a state transition diagram for prescribed state transitions.

FIG. 1 is a block diagram representation of a conventional sequence control system for controlling a sequence using a microprocessor. FIG. 2 illustrates a multi-channel state transition diagram consisting of state transition diagrams for the channels.

In the conventional microcontroller as shown in FIG. 1, interruption controller 63 is enabled by a sampling pulse generated by timer 64 at a fixed time interval or processing period Ts. Program memory 62 stores a program for controlling the sequences associated with the state transition diagrams for processing channels CH0–CHn as shown in FIG. 2. Each processing channel may have a multiplicity of states (for example State 0–State 2 in the case of channel CH0) and a multiplicity of state transitions associated with the states (for example state transitions (a)–(g) in processing channel CH0). Input/ Output (I/O) port 65 is provided to receive necessary information from an external source and provides control signals to external devices.

Microprocessor (MPU) 61 is enabled by a signal from interruption controller 63 to execute an interruption program to control the sequence for that processing period associated with the signal. At this point of time, the MPU obtains information from an external source and from the program stored in program memory 62 to determine the objects to process in the processing period, and then starts processing of the objects sequentially in each channel. All the channels (i.e. objects in the channels) will be processed in a given period Ts.

Such a conventional sequence control system as mentioned above requires enablement of an interruption program, execution thereof, determination of the current states as well as objects to be processed therefor, for each sampling period. Thus, as the sequence in each channel becomes complex and/or multiple channel processing is needed, the total number of steps in one sampling period Ts becomes enormous.

Consequently, it is becoming increasingly difficult for conventional general purpose microprocessors to finish all or the required processes within a limited sampling period Ts. Thus, if a conventional sequence control system were used, use of an advanced faster processor having a faster operational speed (or higher clock frequency) or an additional external hardware would be inevitable.

SUMMARY OF THE INVENTION

The invention is directed to an improved microcontroller having a simple hardware mean, capable of reducing a number of processing steps of a program, thereby enabling processing of a complex multi-channel sequences without using advance processors or external hardware. The microcontroller of the invention has a feature that it can be used with a conventional general purpose microprocessor.

In one aspect, the invention provides a programmable microcontroller for controlling multi-channel sequences of states to be processed in each processing period based on prescribed state transitions, comprising;

state registers for holding the state data to be processed in the next processing period, wherein
said microcontroller is adapted to execute, upon receipt of a channel processing request, a program for processing the states in the channels addressed by said channel processing request in accordance with the state data held in said state registers for said channels.

In this arrangement, the microcontroller require no fast microprocessor in handling a multi-channel program since it has state registers as described above for registering the state data for each of the channels to be processed in one processing period. Thus, the microcontroller has an architecture which is suitable to represent sophisticated state transition diagrams and to establish efficient sequences for the program.

In another aspect, the invention provides a programmable microcontroller for controlling multi-channel sequences of states to be processed in each processing period based on prescribed state transitions, comprising:

state registers, one for each of said channels, for holding the state data to be processed in the respective channels in the next processing period, wherein
said microcontroller is adapted to execute, upon receipt of a channel processing request for processing the states in each of the channels designated by said request, a program for processing said states within said processing period in accordance with the state data currently held in the respective state registers.

In this arrangement, the microcontroller has state registers for registering the state data for each of the channels to be processed, which is suitable in representing state transition diagrams and establishing efficient processing sequences for the program. In addition, since the processing of the channels may be sequentially carried out in a given processing period based on the state data held in the respective state registers, sequential processings of the channels can be performed independently. Thus, if a multiplicity of state transitions distributed over different channels must be processed by a single processor, they can be described in a program as independent pieces that can be processed in the respective channels, thereby allowing for simple programming and simple debugging.

In a further aspect, the invention provides a programmable microcontroller for controlling multi-channel sequences of states to be processed in each processing period based on prescribed state transitions, comprising:

state registers, one for each of said channels, for holding the state data to be processed in the respective channels in the next processing period, wherein said microcontroller is adapted to:

receives a sampling dock defining said processing period without being interrupted by a timer or a program;

receive, upon receipt of said sampling clock, a channel processing request for processing the states in the channel designated by said request in the current processing period; and execute a program for processing said states in accordance with the states data held in said state register.

In this arrangement, the microcontroller has a hardware feature that it is enabled directly by a sampling clock signal to start the program for processing the states based on the state data held in the state register for each of the channels. In addition, the microprocessor has a suitable architecture to represent a state transition diagrams for such program. Thus, it is possible to configure efficient sequences for a program without resorting to a fast microprocessor. It is noted that, in this example, the sequence of the program split into independent pieces to be processed in sequence in the respective channels within a given processing period. Hence, even in a case where such multi-channel state transitions must be carried out by a single processor, the program can be written as a simple collection of steps to be performed in the respective states. This implies that debugging of the program is easy.

In a still further aspect, the invention provides a microcontroller for controlling multi-channel sequences of states in which a determination is made, at the point when the current program for one channel is finished, to decide on the program that must be performed in the next processing period and overwrites state register for that channel.

It should be noted that, in this arrangement, the state data in the state register associated with each channel is overwritten at the end of the program for the channel, based on the current states and external information available, so that updating of the state registers can be done quite easily.

BRIEF DESCRIPTION OF THE DRAWINGS

The invention will now be described in detail by way of example with reference to accompanying drawings, wherein.

DETAILED DESCRIPTION OF THE PREFERRED EMBODIMENT

Figure 3:
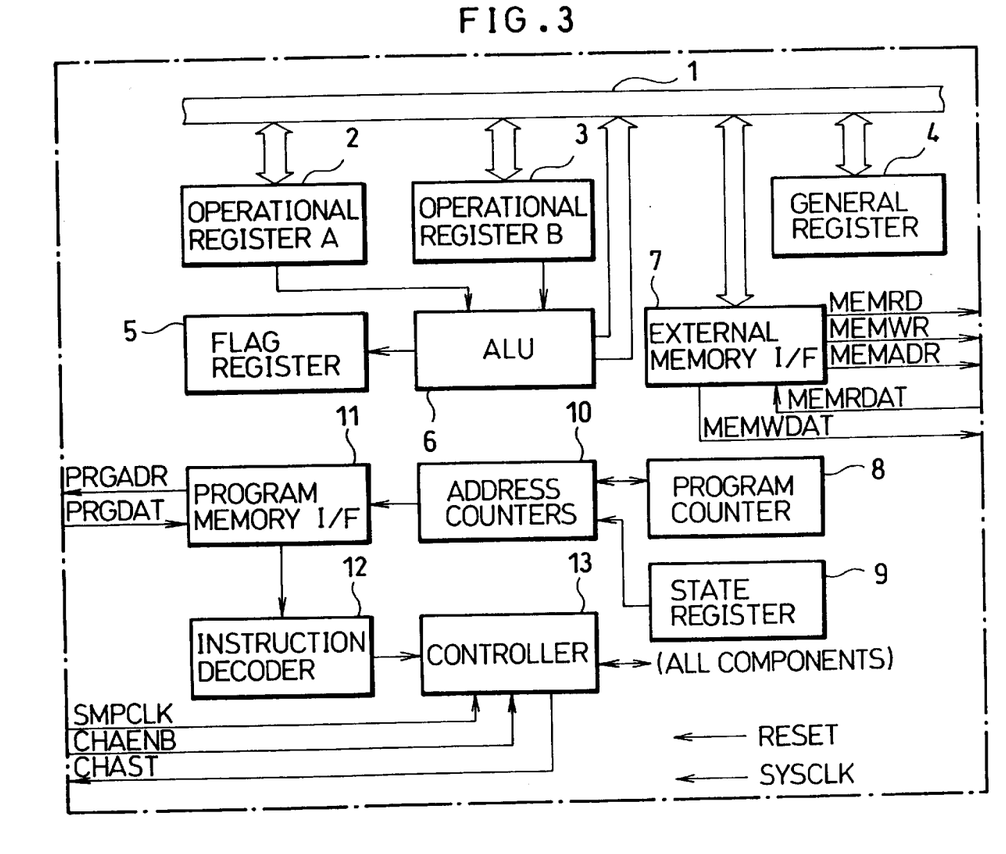
FIG. 3 is a block diagram of a microcontroller for controlling a servo sequence accordant to the invention.
Figure 4:
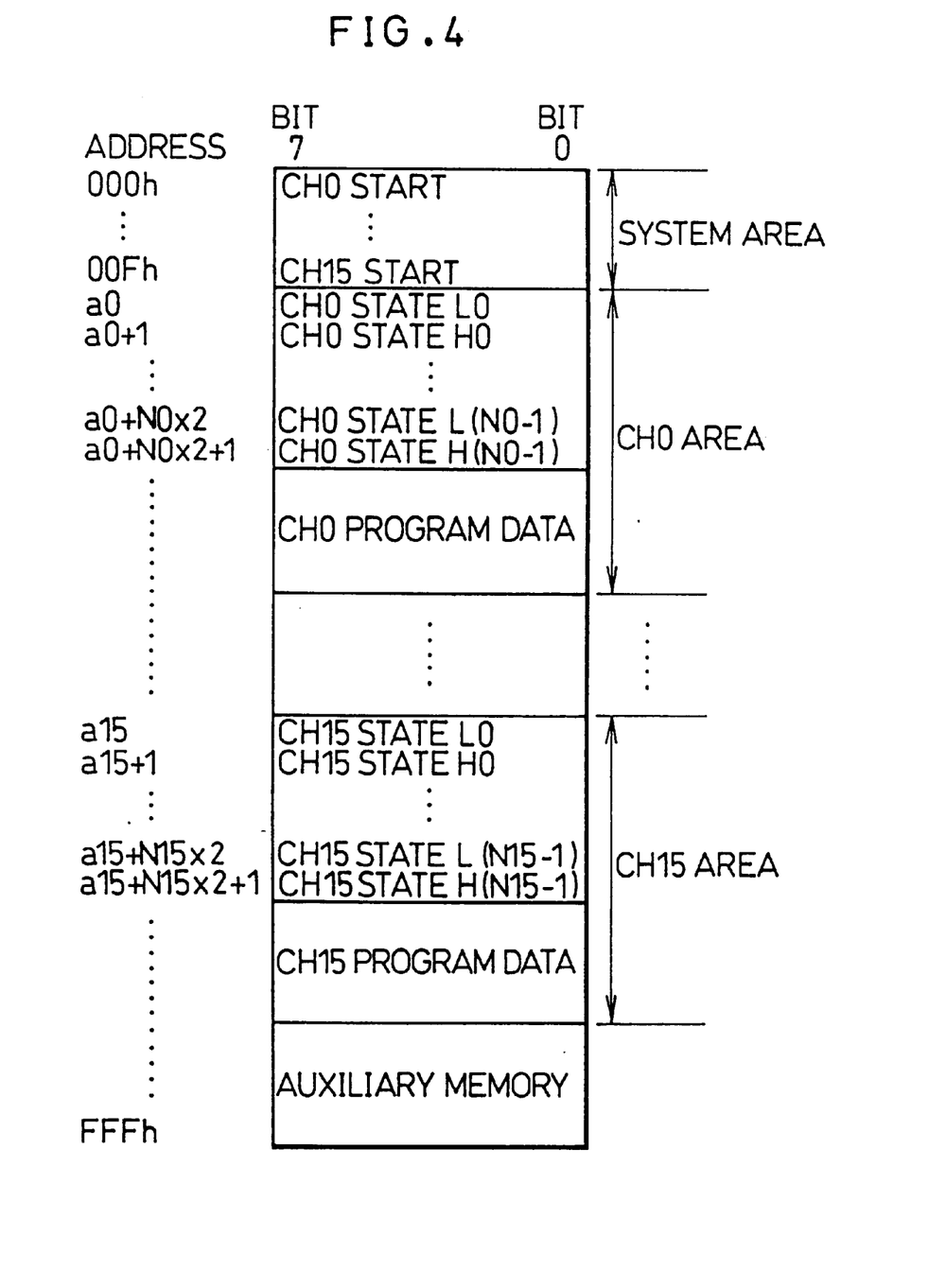
FIG. 4 is a memory map of a program.
Figure 5:
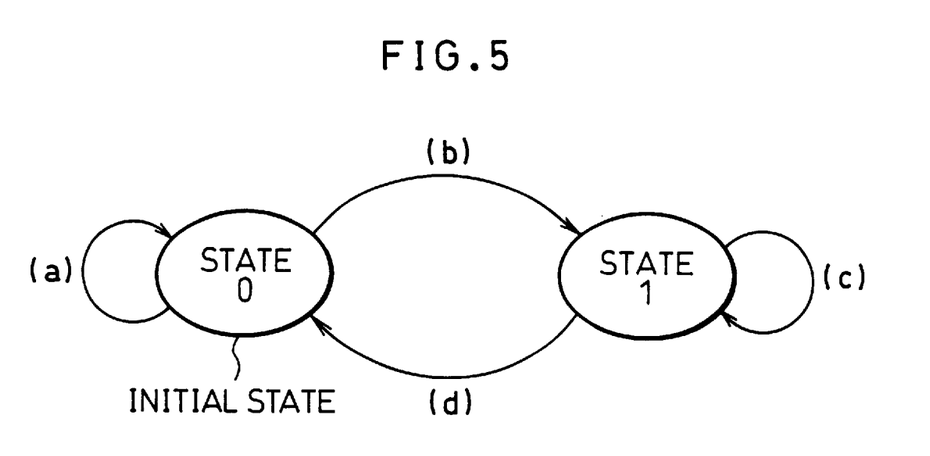
FIG. 5 illustrates a state transition diagram useful in understanding a program involving the state transitions as shown.
Figure 6:
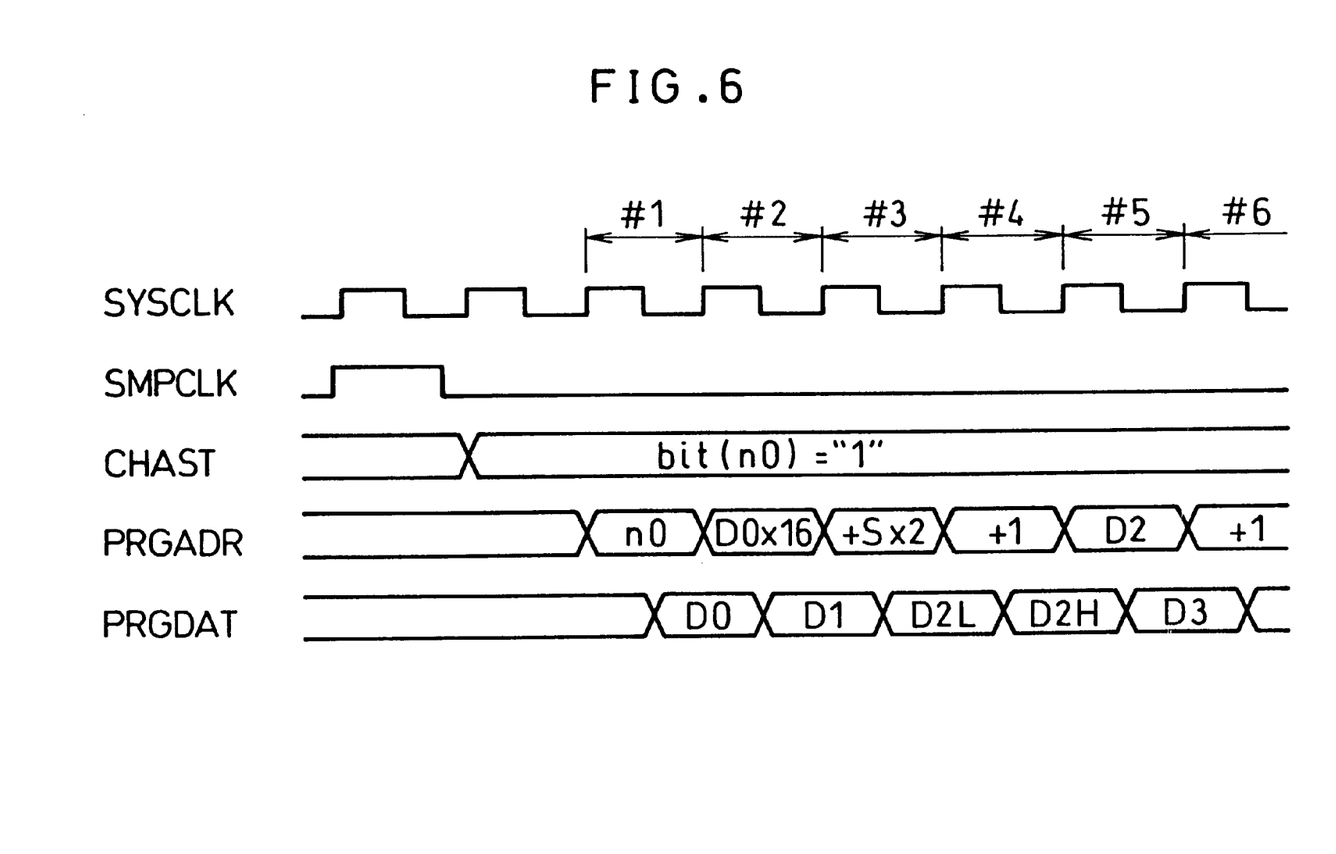
FIG. 6 is a timing chart for the microcontroller immediately after receiving a sampling clock.
Figure 7:
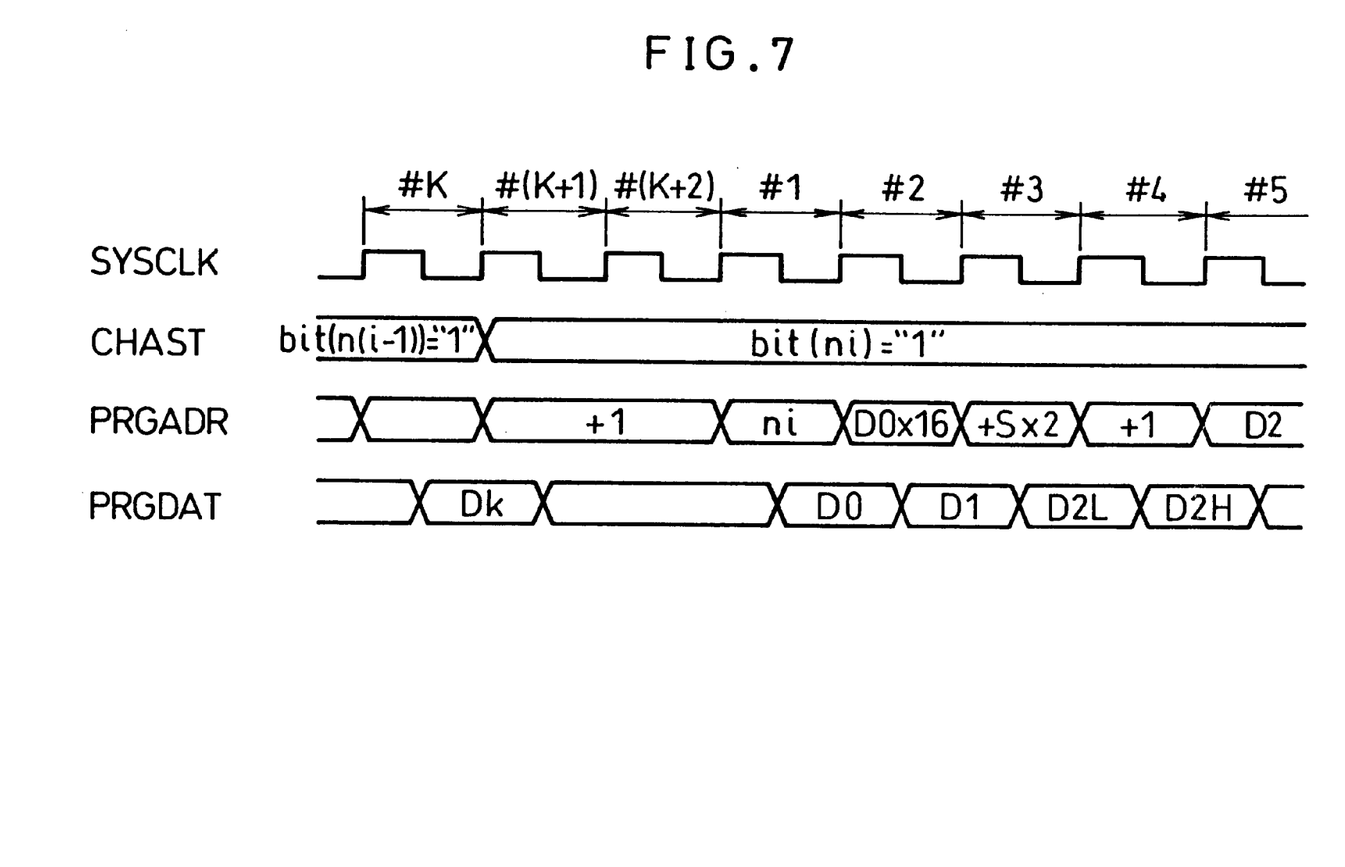
FIG. 7 is a timing chart showing a transition from one channel to another.

Referring now to FIGS. 3–7, there is shown a microcontroller according to the present invention. In particular, FIG. 3 is a block diagram of the microcontroller for controlling a servo-sequence; FIG. 4 is a memory map for a program executed by the microcontroller; FIG. 5 illustrates a state transition diagram of the program; FIGS. 6 and 7 are timing charts for the microcontroller.

The invention forms an ordinary microprocessor which includes bus line 1, operational registers A2 and B3, general purpose register 4, flag register 5, operational logic unit 6, and external memory I/F 7, as shown in FIG. 3.

The microcontroller further includes: program counter 8 for holding and providing different addresses of the program used in processing the states; state registers 9, one for each channel, for registering the states (i.e. state data) to be processed in the channel; and address counter 10 which causes the program counter 8 to store the addresses, and, upon receipt of the state data stored in the state register 9, provide program memory I/F 11 with a required address of the program.

Program memory I/F 11 provides a program address PRGADR to a program memory shown in FIG. 4 and receives program data PRGDAT from the program memory. Also included in the microcontroller is instruction decoder 12, which decodes program data PRGDAT received from program memory I/F 11, and supplies the decoded data to controller 13.

Controller 13 is connected with all other components and blocks, and receives a sampling clock signal SMPCLK, a request signal CHAENB for enabling a channel specified by signal CHAENB, and in turn outputs channel status signal CHAST. Controller 13 monitors a sampling clock signal SMPCLK supplied thereto to detect the rise of the channel processing request signal without any interruption by a timer. If controller 13 detects the rise, it determines the channel addressed by the request signal CHAENB at this moment. If there is more than one channel requested by the channel processing request signal CHAENB, these channels will be processed sequentially in a predetermined order.

In the example shown herein above, there are 16 processing channels, which include channels for servo offset regulation and for open-loop gain regulation, for example. There are also 16 corresponding state registers 9. Therefore, in this example, a channel processing request signal CHAENB and a channel status signal CHAST are expressed in 16 bits in correspondence with the number of the channels. The sampling clock signal SMPCLK and the system clock signal SYSCLK have frequencies of 88 kHz and 34 MHz, respectively.

The program memory shown in FIG. 4 has 8 bit addresses, which are divided into two sections: one for System Area having sixteen start addresses for the respective channels 0–15, and another for Channel Area which includes a state address and program data PRGDAT for each of the sixteen channels. In FIG. 4, "N" stands for Nth state in a channel.

Shown below is a simple exemplary program used in conjunction with a simple state transition diagram shown in FIG. 5.

---

:State-0
Instructions

| | |
|---|---|
| JEQ Label 1 | (← Conditional branch) |
| STP 0 | (← Execute the same program also in the next period (a)) |
| :Label 1 | |
| STP 1 | (← Jump to State 1 and then execute the program (b)) |
| :State-1 | |

-continued

| Instructions | |
|---|---|
| JEQ Label 2 | (← Conditional branch) |
| STP 1 | (← Execute the same program also in the next period (c)) |
| :Label 2 | |
| STP 0 | (← Jump to State 0 and then execute the program (d)) |

It should be understood that this program is written for a particular channel, and that similar programs are provided for other channels. Each instructions set includes a set of instructions to be executed in the associated state. The conditional branches include instructions to determine the branch that the procedure proceeds to, as a consequence of the comparison of the register contents and/or bit tests, for example.

In the case shown herein above, the initial state is "State 0" as shown in FIG. 5, so that appropriate instructions in accord with State 0 will be executed in this channel. After the processing of State 0, a determination is made whether the same instructions be repeated for State 0 again in the next sampling period (State transition (a) ) or further instructions be executed for State 1 in the next sampling period (State transition (b)), depending upon the branch conditions, and then so overwrites state register 9 for that channel.

In the next sampling period, the program is executed in the same manner for State 0 and State 1 in accordance with the content of register 9.

Referring to FIGS. 6 and 7, the operation of the microcontroller controlling servo sequences will now be described in detail.

Referring now to FIG. 6, there is shown a timing chart immediately after a sampling clock signal SMPCLK is received by the microcontroller. Since servo sequence control is started by the rise of a sampling clock signal SMPCLK, controller 13 monitors the sampling clock signal SMPCLK it receives without any interruption by a timer for a rise.

It would be noted that the microcontroller is configured to start the program on a hardware basis by the rise of the sampling clock signal SMPCLK.

With a rise of the sampling clock signal SMPCLK, controller 13 determines the processing channels designated by a processing request signal CHAENB it receives separately at this point. These designated channels are processed in turn, starting from the one having the smallest channel number, which is channel 0 in this example.

In return for the receipt of a channel processing request signal CHAENB, controller 13 outputs a channel status signal CHAST which represents the channel being processed.

Controller 13 instructs the program memory I/F 11 to issue a program address PRGADR indicative of the address of the program to process the addressed channel, which is presently "n0" (actually 000 h in hexadecimal notation) for Channel 0. The microcontroller then obtains, as program data PRGDAT D0, starting address "CH0 Start" from the system area in the program memory in association with the program address PRGADR "n0", and multiply "CH0 Start" by 16 (i.e. shift it by four bits to the left) before it is stored in program counter 8.

The microcontroller then retrieves the state data for Channel 0 from the associated state register 9. Here, it is assumed that the state of Channel 0 is State 0. A new program address PRGADR (D0*16+S*2) is obtained by first multiplying "State 0" by 2 (i.e. shifting it by 1 bit to the left) and multiplying by 16 the value "CH0 Start" stored in program counter 8 and then adding them together. The new program address is output from program memory I/F 11 to the program memory.

The microcontroller obtains the value "CH0 State L0" stored at the program address PRGADR (D0*16+S*2) as the program data PRGDAT D2L, and increments the program address PRGADR by 1.

The microcontroller obtains the value CH0 State H0 from the program data PRGDAT, stored at the program address PRGADR (D0*16+S*2+1), and use it as the program data PRGDAT D2H to calculate a program address PRGADR, (D2H+D2L), by combining D2H and D2L as upper and lower halves of the address, respectively. (Correctly, since D2H is the upper half digits, the address is (D2H*256+ D2L).)

The program address PRGADR, (D2H+D2L), is supplied to the program memory via program memory I/F 11. In this example, the channel being processed is Channel 0, so that the program data PRGDAT to be processed in Channel 0 is retrieved from the program address PRGADR, (D2H+D2L), in the program data area CH0.

The microcontroller has a standard structure comprising a bus line 1, operational registers A2 and B3, a general purpose register 4, a flag register 5, an operational logic unit 6, and an external memory I/F 7, and executes the program thus retrieved for Channel 0. The program includes such instructions and algorithms as arithmetic, logic operations, data transfers between registers, data transfers between the internal registers and the external memory, bit tests, conditional and non-conditional branches, and a terminating procedure.

The result of the processing obtained in this sampling period is stored in a state register 9 associated with Channel 0. Upon receipt of a process termination instruction at the end of the processing, the state (e.g. State 0 or State 1) to be processed in the next sampling period is determined and stored. The processing of Channel 0 is terminated by the termination instruction.

Next, in response to the channel processing request signal CHAENB, a similar processing is carried out for a channel that awaits the processing thereof if any. FIG. 7 is a timing chart showing how channel processing shifts from one channel to another. In this example, processing of channel i follows the processing of channel (i−1), as seen from the behavior of channel status CHAST. It would be apparent from FIG. 7 that immediately after the arrival of a sampling clock signal SMPCLK of FIG. 6, program address PRGADR, "ni", is issued from program memory I/F 11 based on an instruction received from controller 13 for channel i. This channel i only differs from other channels in that the start address CHi Start for channel i is retrieved as the program data PRGDATD0 from the corresponding system area of the program memory in response to the program address PRGADR, "ni". Each of the subsequent channel processings proceeds in a similar manner as shown in FIG. 6. When all the channel processings are completed in the sampling period Ts, the procedure returns to the stand-by condition, waiting for the next sampling clock SMPCLK.

As described above, the invention provides the controller 13 with a sampling clock signal SMPCLK to start a program without any interruption by a timer. Thus, the microprocessor may immediately undertake aimed processing. The state data that must be processed in a given channel is stored in the associated state register 9, which is retrieved therefrom upon receipt of a sampling clock signal SMPCLK to cause the procedure to jump to the program address PRGADR for a relevant program, thereby allowing a prompt execution of the program. At the end of each channel processing, the states that must be executed in the channel in the next sampling period are registered in the corresponding state registers 9. The procedure then proceeds to the processing of the next channel.

The invention may provide an optimum architecture in realizing state transitions in accord with state transition diagrams by the use of state registers 9 in the manner as described above. Thus, the invention enables construction of very efficient sequences for a program.

According to the invention, it is possible to make multi-channel processings mutually independent and execute them sequentially within a sampling period by providing state registers 9, one for each channel, to thereby circumvent complexity as encountered inevitably in dealing with a multi-channel state transitions of a sophisticated program. Thus, one may construct a program by simply scripting steps for each state. Accordingly, debugging of the program will be easier.

It is noted that, if the state registers 9 are made externally observable, state transitions during a given sampling period can be observed, so that the debugging can be done using a simple tool such as a logic analyzer, without using ICE emulators.

It would be appreciated that the microcontroller of invention has a simple architecture and requires only a small circuit, so that it is suited for a dedicated microcontroller for use in sequence control.

I claim:

1. A programmable sequential microcontroller for sequentially controlling a multiplicity M of processing channels in processing periods based on respective state transitions of the respective channels, said microcontroller comprising:

an address counter for supplying address data to a program memory, thereby causing said program memory to output program data associated with said address data;

a state register for holding the state data to be processed in the respective channels in accord with said state transitions, wherein

M>3;

said microcontroller sequentially performs programs associated with the state data of the respective channels in response to a processing request when a period signal, indicative of a period, is received, such that, in processing a program in each said channels said address counter integrates the start data stored in a start address allocated to said channel in said program memory and the state data of said channel stored in said state register to obtain an integrated address for that channel; and the program data stored in said integrated address is processed first of all the program data to be processed in said channel;

wherein an integrated processing to obtain said integrated address is performed on said state data and the data obtained by multiplying said start data by a predetermined number.

2. A programmable sequential microcontroller for sequentially controlling a multiplicity M of processing channels in processing periods based on respective state transitions of the respective channels, said microcontroller comprising:

an address counter for supplying address data to a program memory, thereby causing said program memory to output program data associated with said address data;

a state register for holding the state data to be processed in the respective channels in accord with said state transitions, wherein

M>3;

said microcontroller sequentially performs programs associated with the state data of the respective channels in response to a processing request when a period signal, indicative of a period, is received, such that, in processing a program in each said channels said address counter integrates the start data stored in a start address allocated to said channel in said program memory and the state data of said channel stored in said state register to obtain an integrated address for that channel; and the program data stored in said integrated address is processed first of all the program data to be processed in said channel;

wherein said period signal is a sampling clock directly input to said microcontroller; wherein said microcontroller further comprises a program counter for storing the data obtained by multiplying said start data by a predetermined number, and wherein said address counter adds said multiplied data stored in said program counter to said state data stored in said state register.

3. The microcontroller according to claim 2, adapted to determine, at the point in time that processing of the program for a respective channel is finished, the state to be processed in said channel in the next period and overwrites the state data for said channel for the next period.

4. A programmable sequential microcontroller for sequentially controlling a multiplicity M of processing channels in processing periods based on respective state transitions of the respective channels, said microcontroller comprising:

an address counter for supplying address data to a program memory, thereby causing said program memory to output program data associated with said address data;

a state register for holding the state data to be processed in the respective channels in accord with said state transitions, wherein

M>3;

said microcontroller sequentially performs programs associated with the state data of the respective channels in response to a processing request when a period signal, indicative of a period, is received, such that, in processing a program in each said channels said address counter integrates the start data stored in a start address allocated to said channel in said program memory and the state data of said channel stored in said state register to obtain an integrated address for that channel; and the program data stored in said integrated address is processed first of all the program data to be processed in said channel;

wherein said period signal is a sampling clock directly input to said microcontroller; wherein said microcontroller is adapted to determine, at the point in time that processing of the program for a respective channel is finished, the state to be processed in said channel in the next period and overwrites the state data for said channel for the next period; wherein said microcontroller further comprises a program counter for storing the data obtained by multiplying said start data by a predetermined number, and wherein said address counter adds said multiplied data stored in said program counter to said state data stored in said state register.

* * * * *